Dec. 3, 1957     J. SALLOU     2,814,978
VARIABLE-FLOW AIR DISTRIBUTORS FOR AIR-CONDITIONING
AND VENTILATION SYSTEMS
Filed May 12, 1954     4 Sheets-Sheet 1
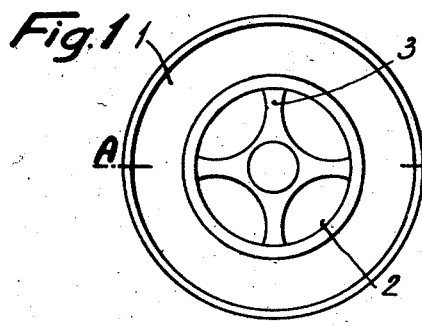
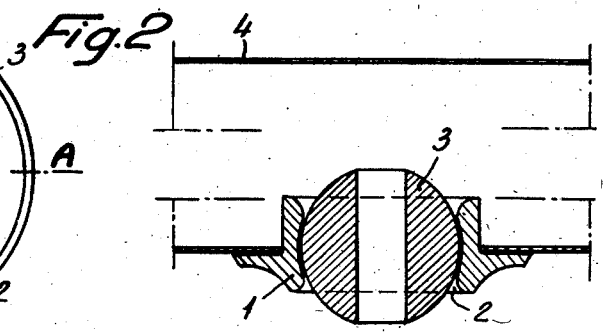
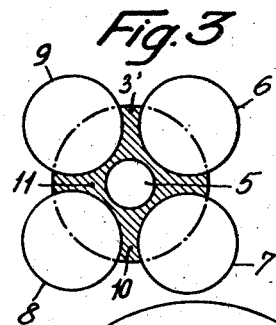
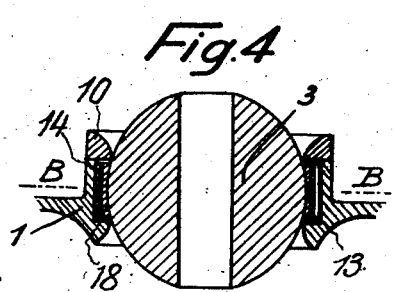
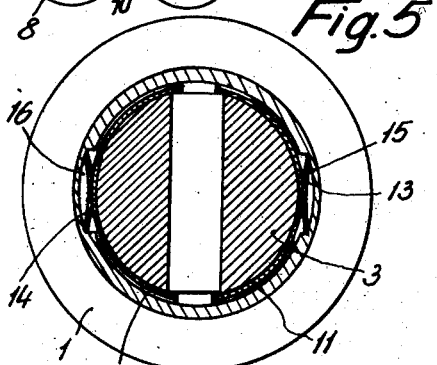
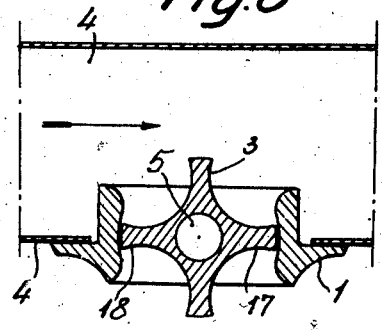
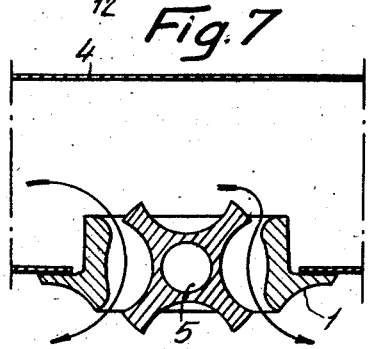
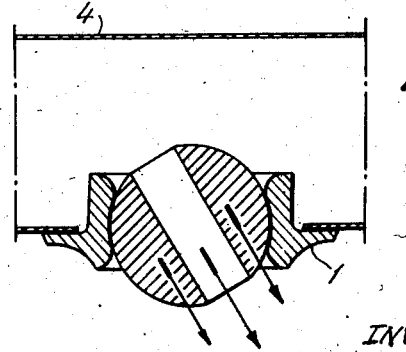
INVENTOR
JEAN SALLOU
BY
ATTORNEY

INVENTOR
JEAN SALLOU
BY
ATTORNEY

Dec. 3, 1957 J. SALLOU 2,814,978
VARIABLE-FLOW AIR DISTRIBUTORS FOR AIR-CONDITIONING
AND VENTILATION SYSTEMS
Filed May 12, 1954 4 Sheets-Sheet 3

INVENTOR
JEAN SALLOU
BY
ATTORNEY

United States Patent Office 2,814,978
Patented Dec. 3, 1957

2,814,978

VARIABLE-FLOW AIR DISTRIBUTORS FOR AIR-CONDITIONING AND VENTILATION SYSTEMS

Jean Sallou, Paris, France, assignor to Societe Anonyme des Etablissements Neu, Lille, France, a corporation of France, and Jean Leon Fourtier, Paris, France Application May 12, 1954, Serial No. 429,329

Claims priority, application France May 19, 1953

10 Claims. (Cl. 98—40)

This invention relates in general to air distributors, nozzles or valves and more particularly to an improved variable-flow air distributor for ventilation and air-conditioning systems, of a type adapted to act either as a swivelling nozzle for blowing air in jet form in the desired direction, or as a diffuser for blowing air in sheet form, or both.

In ventilation and air-conditioning systems, air is distributed in the rooms concerned at velocities varying according as the air flow is to be felt or not by the occupants. There are on the one hand ventilation or air-vents through which air is blown in the form of a high-speed jet adjustable in direction, and on the other hand air-vents through which a substantial volume of air is blown without appreciably displacing or stirring the atmosphere in the treated room. Finally, there are air-vents so designed that by operating suitable control means the installation may be switched at will from one type of ventilation to another.

It is the essential object of this invention to provide an air-distributor adapted to advantageously combine both types of air distribution.

According to this invention, the air-distributor is adapted to be mounted in a air-conditioning system and is provided with a valve member formed with a central passage and radial blades so arranged that, according as the valve member is set in one or another position, the stream of air may be blown therethrough either in the shape of high-speed jet adjustable in direction, or in the form of a pair of diffused sheets, the device being also adapted to stop the stream of air completely when set in a third position.

The arrangement according to this invention has the specific advantage of producing a highly-concentrated jet of air adapted to be directed at will in any desired angular relationship to the axis of the device, the valve member being easily adjusted even by using a stick or the like when the air-distributor is mounted on the ceiling of an air-conditioned room.

Regarding the diffusion of conditioning air in sheet form, it occurs in a fixed plane parallel and very close to the plane of mounting of the device. Thus, any displacement or stirring of the atmosphere in the treated room is avoided when the device is set for operation in this manner. On the other hand, the combined air-vent may be designed for connection with two different pipes or systems, whereby the device may either diffuse two air streams at different temperatures or be utilized as an exhaust diffuser.

The attached drawings forming part of this specification illustrate diagrammatically by way of example a few forms of embodiment of the invention.

In the drawings:

Figure 1 is an elevational, diagrammatical view of an air-distributor according to the invention;

Figure 2 is a sectional plan view from above of the distributor, the section being taken upon the line A—A of Fig. 1;

Figure 3 is an elevational view of the valve member of the device;

Figure 4 is a sectional plan view from above of the device, the section being taken upon the line A—A and showing the specific mounting of the valve member;

Figure 5 illustrates in elevational and sectional view the distributor, the section being taken upon the line B—B of Fig. 4;

Figure 6 is an axial section showing the mounting of an air-distributor according to this invention on a ventilation pipe, the valve member of the distributor being set in its closed position;

Figure 7 is a view similar to Fig. 6 showing the valve member set in the position in which the air is blown in sheet form;

Figure 8 is a view similar to Figs. 6 and 7, showing the valve member set in the proper position for blowing an air jet adjustable in direction;

Fig. 9A is a sectional view corresponding to Fig. 9 but showing modified form of construction wherein the threaded engagement of Fig. 9 is replaced by a sliding engagement of parts;

Figure 9:
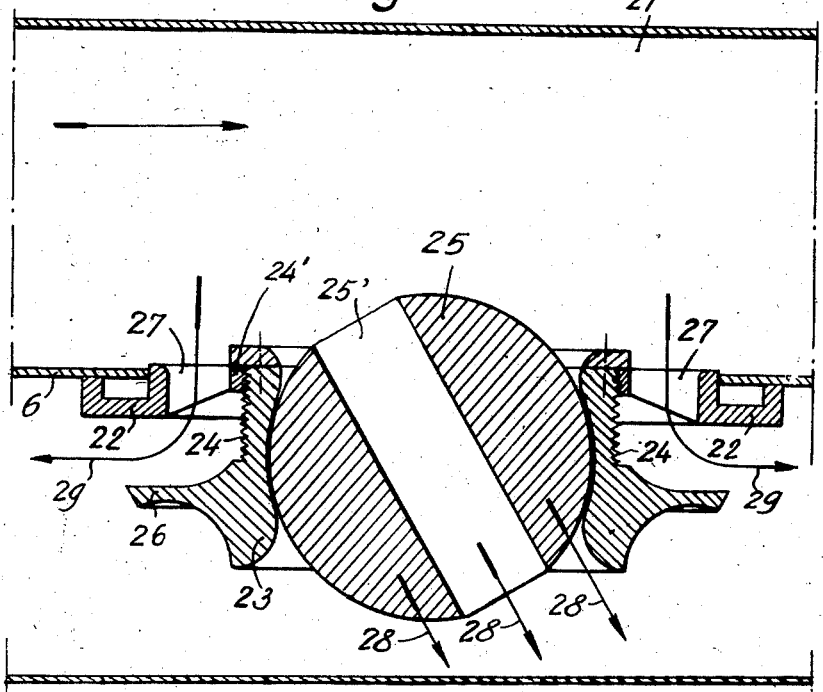
Figure 9 is a section view from above showing a modified form of embodiment of the air-distributor according to this invention, wherein the jet and sheet forms of air distribution are combined.
Figure 9:
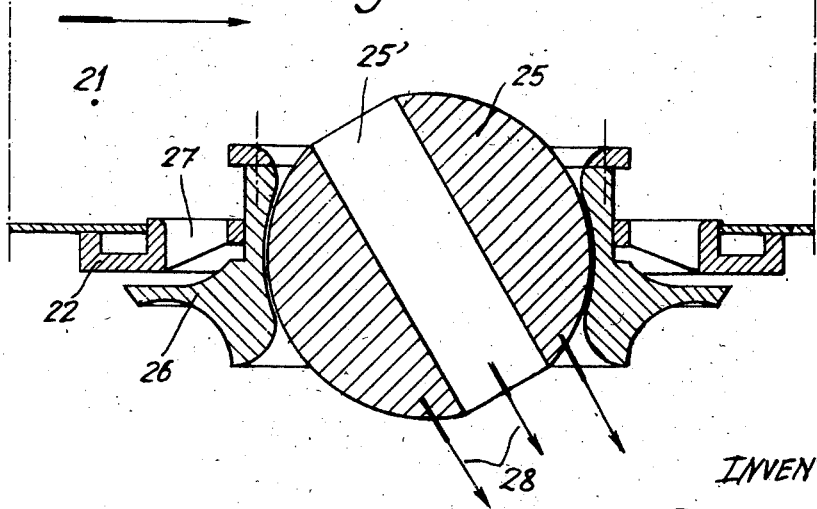

The air-distributor shown in Figs. 1–3 of the drawings consists essentially of an annular member or fitting 1 formed with a circular aperture 2 in which a valve member 3 is fitted, somewhat in the fashion of a ball-and-socket joint. The device is secured through the annular member 1 to a ventilation or like pipe 4 (Figs. 1 and 2).

As shown more particularly in Fig. 3, the valve member 3 is machined or otherwise formed from a spherical body 3' through which a central bore 5 is formed together with four curved notches, the latter resulting for example from the use of cylindrical tools shown diagrammatically at 6, 7, 8 and 9, and operated with their axes disposed at spaced angular intervals and at a common radius from the centre of bore 5, the circle on which the axes of these cylindrical tools or the like are positioned being tangent to the sperical body.

The resulting valve member is mounted in the aperture 2 of the annular member 1 and the assembly constitutes a swivel-like device in which the valve member is rotatable in all directions.

As shown in the drawings, the aperture 2 has the shape of a spherical segment of a diameter substantially equal to that of the spherical body 3', the axial length of this aperture being slightly greater than the diameter of the central bore 5.

According to a preferred form of embodiment of the invention, and in view of permitting the mounting of the valve member in the annular member 1, the upper end of the annular member is constituted by a detachable flange 10 (Fig. 4); thus, after having positioned the valve member 3 in the annular member 1, this flange 10 is fastened in position, for example by means of two or more screws (not shown). The spherical segment in which the valve member is free to swivel consists of two half-sections 11, 12 of substantially semi-circular shape, disposed in the annular member 1 with a light friction fit. These half-sections 11, 12 are continuously urged against the valve member 3 by a pair of springs 13, 14 consisting of dished blades which are slightly bowed when seated in suitable notches 15, 16 formed in the annular member 1. With this arrangement, it is possible to dispense with a high degree of accuracy in the adjustment of the interfittings spherical surface of the parts involved since the half sections 11, 12, by reason of their frictional engagement with the valve member 3, hold the valve member in position in the annular member 1 and maintain it in its various positions of adjustment.

The above-described form of embodiment of the air-distributor according to this invention operates as follows:

The annular member or fitting 1 is secured on a ventilation or air-conditioning pipe 4 and the valve member 3 adapted to be swivelled in any direction in this member while being retained therein; when it is desired to position the valve member 3 in its closed condition, in which no air is allowed to flow through the device, the valve member is placed with its central bore 5 at right angles to the axis of the annular member 1 (Fig. 6), one of the blades 17 or 18 being coplanar with the annular member 1.

From the position described in the preceding paragraph the valve member may be rotated through 45° about the axis of the central bore 5 and in this position the device will distribute two oppositely-directed streams of air in sheet form (Fig. 7).

Finally, by suitably orienting the axis of the central bore 5, so that it enables the pipe to communicate with the room to be conditioned or ventilated, an air jet having the desired direction will flow through both the central bore and the curved notches (see Fig. 8).

An exemplary composite air-distributor also in accordance with the teachings of this invention is illustrated in Fig. 9 of the drawings. In a pipe 21 of the air-conditioning or ventilation system there is formed an aperture, for example of circular configuration, having its edges reinforced by a frame 22 formed with an internally-threaded inner annular portion 24' which is connected to frame 22 by means of struts (not shown) to define with frame 22 an annular aperture 27. Threadedly engaged with inner annular portion 24' is an annular member 23 having an externally-threaded portion 24. The inner surface of the annular member 23 is of spherical-segment shape and has mounted therein, in ball-and-socket fashion, a valve member 25 as in the preceding example.

The annular member 23 is also formed with a fixed annular flange 26 registering with the annular aperture 27 formed in the frame 22.

In Fig. 9, the composite distributor is shown with its central diffuser (constituted by the inner surface of annular member 23 and by the valve member 25) positioned to emit a concentrated air jet directed in the sense of the arrows 28, this jet being formed through the central bore 25' and in the curved notches of the valve member. On the other hand, the peripheral air diffuser constituted by the annular aperture 27 will emit a circular sheet of air in the direction of the arrows 29.

The direction of the air jet issuing from the device may be altered by simply rotating the valve member 25 through the desired angle. The central diffuser may be closed by rotating the valve member 25 until the axis of the central bore 25' is at right angles to the axis of the annular member 23 and until its aperture is closed completely by one of the blades of the valve member 25. When it is desired to reduce the output flowing through the peripheral diffuser, the annular member 23 is screwed in to move the flange 26 toward the frame 22 to the desired degree. The diffuser is closed when the flange engages the outer edge of the annular aperture 27.

According to another form of embodiment of the invention, shown in Fig. 9A, the annular member 23 may be slidably mounted in the frame 22 instead of being screwed therein. Thus, the aforesaid inner and outer threads may be dispensed with.

Figure 10:
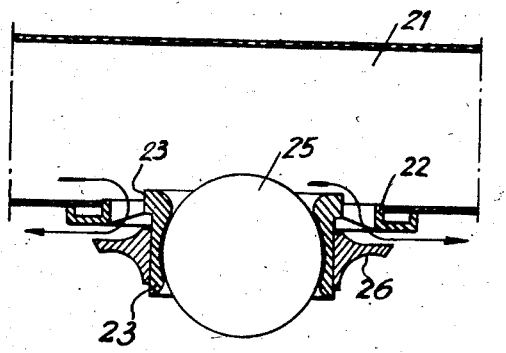
Figure 10 is a sectional view from above showing an air-distributor combined with an adjustable ring member.
Figure 11:
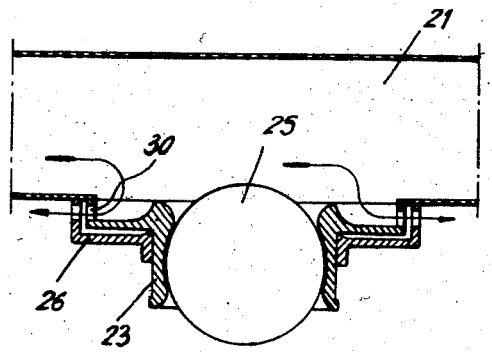
Figure 11 is a sectional plan view showing a modified embodiment of the air-distributor and adjustable ring member arrangement.

It is also possible to secure the annular member 23 to the frame 22 and to mount the flange 26 for axial adjustment on the annular member 23, through a sliding engagement (see Fig. 10). The movable flange may also be formed to correspond in shape to a widened base portion of the annular member so as to act as an adjustable shutter to one or more lateral orifices 30 (Fig. 11).

Figure 12:
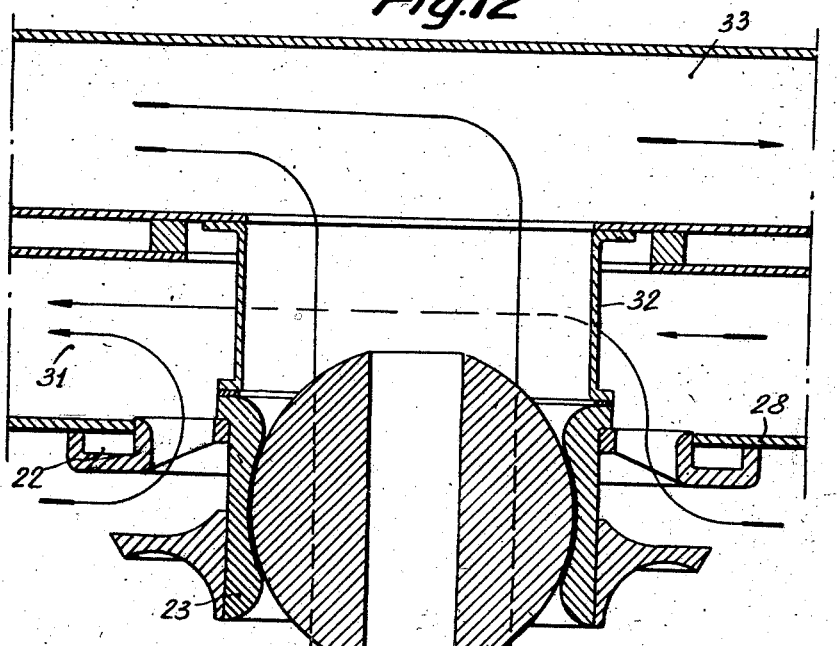
Figure 12 shows in sectional plan view a composite air-distributor and adjustable ring member arrangement mounted on and communicating with two separate air-distributing pipes.

The composite device according to this invention may also be used for the dual purpose of blowing and exhausting air therethrough, as shown in Fig. 12. In this figure, the frame 22 is shown as being secured to a pipe 31 of an exhaust system while the annular member 23 is clamped against a nozzle 32 to connect the central diffuser of the device with a delivery pipe 33 of a ventilation or air-conditioning system.

Figure 13:
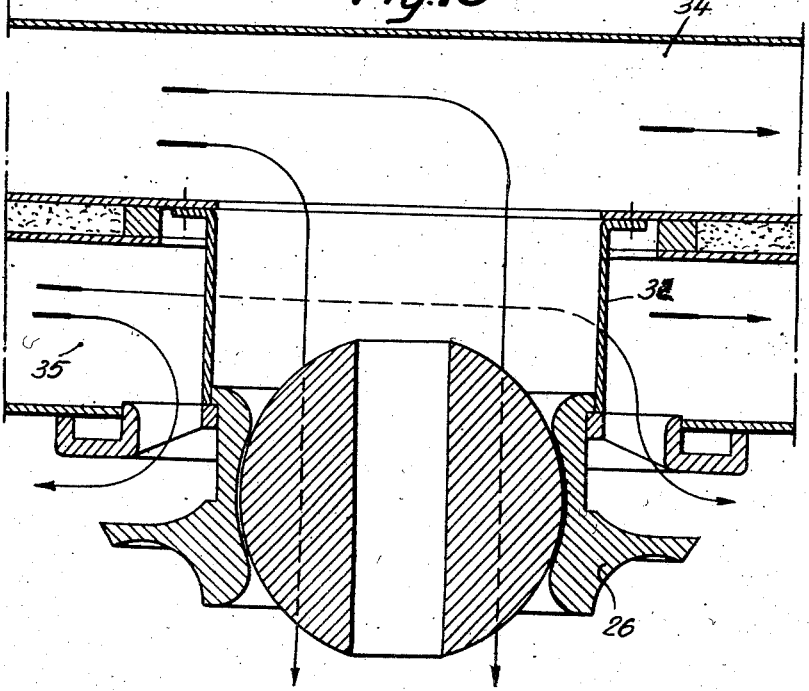
Figure 13 illustrates another form of embodiment of the composite air-distributor shown in Fig. 12.

The composite diffuser may also be connected on the one hand with a pipe 34 supplying heated air and on the other hand with a fresh air supply pipe 35, (see Fig. 13). Thus, the temperature of a room may be adjusted by regulating the respective outputs of both diffusers.

The apparatus and applications described herein should not be construed as limiting the scope of the invention, as they constitute but mere examples of the manner in which the invention may be carried out in the practice. Obviously, many modifications may be brought to these examples, without however departing from the spirit and scope of the invention as set forth in the appended claims. Thus, notably with reference to the central diffuser bore, this may be replaced by any other suitable ventilation apparatus adapted to be combined with the peripheral diffuser. Similarly, the invention is not limited to the blowing and exhaustion of air, as the composite distributor may be employed successfully with other fluids.

I claim:

1. An air distributor for air-conditioning and ventilation purposes which comprises, in combination, an annular member adapted to be secured to an air supply pipe and formed with an axial aperture having the shape of a symmetrical spherical segment, and a valve member mounted for swivelling movement in said axial aperture, said valve member being of generally spherical form with the diameter thereof corresponding substantially to that of said central aperture, said valve being provided with a central bore extending completely therethrough and with notches in its outer surface parallel to and equally spaced from said bore, said valve member being selectively rotatable in said aperture into a position with the axis of its bore coinciding with the axis of said aperture and into a postion with the axis of the bore transverse to the axis of the aperture and in said latter position said valve being selectively rotatable to relate said notches to said aperture to define a path for flow of air through said aperture and to bolck the flow of air through said aperture.

2. An air distributor for air-conditioning and ventilation purposes which comprises, in combination, an annular member adapted to be secured to an air supply pipe and formed with an axial aperture having the shape of a symmetrical spherical segment, and a valve member mounted for swivelling movement in said axial aperture, said valve member being of generally spherical form with the diameter thereof corresponding substantially to that of said central aperture, said valve being provided with a cylindrical central bore extending completely therethrough and with notches in its outer surface generated by cylinders having their axes parallel to and equally spaced from said bore, said valve member being selectively rotatable in said aperture into a position with the axis of its bore coinciding with the axis of said aperture and into a position with the axis of the bore transverse to the axis of the aperture and in said latter position said valve being selectively rotatable to relate said notches to said aperture to define a path for flow of air through said aperture and to block the flow of air through said aperture.

3. An air distributor for air-conditioning and ventilation purposes which comprises, in combination, an annular member adapted to be secured to an air supply pipe and formed with an axial aperture having the shape of a symmetrical spherical segment, and a valve member mounted for swivelling movement in said axial aperture, a pair of semi-circular segments embracing said valve member and supporting said valve member in said aperture, said valve member being formed with a recess adjoining said aperture to receive said segments, spring means in said recess for urging said segments toward said member, and a removable flange closing one side of said recess, said valve member being of generally spherical form with the diameter thereof corresponding substantially to that of said central aperture, said valve being provided with a central bore extending completely therethrough and with notches in its outer surface parallel to and equally spaced from said bore, said valve member being selectively rotatable in said aperture into a position with the axis of its bore coinciding with the axis of said aperture and into a position with the axis of its bore transverse to the axis of the aperture and in said latter position said valve being selectively rotatable to relate said notches to said aperture to define a path for flow of air through said aperture and to block the flow of air through said aperture.

4. An air distributor for air-conditioning and ventilation purposes which comprises, in combination with an air pipe having an opening therein, a frame surrounding said opening, an annular member mounted in said frame and communicating with said opening and formed with an axial aperture having the shape of a symmetrical spherical segment, and a valve member mounted for swivelling movement in said axial aperture, said valve member being of generally spherical form with the diameter thereof corresponding substantially to that of said central aperture, said valve being provided with a central bore extending completely therethrough and with notches in its outer surface parallel to and equally spaced from said bore, said valve member being rotatable into a position with the axis of its bore coinciding to the axis of said central aperture and into a position with the axis of the bore transverse to the axis of the central aperture and in said latter position with the notches defining a path for flow of air through said central bore and in a position blocking the flow of air through said central bore, said frame having an outer member and an inner radially-spaced inner member supporting said annular member to define an annular aperture surrounding said annular member nad providing a peripheral air diffuser, and a movable flange member for closing said annular aperture.

5. An air distributor for air-conditioning and ventilation purposes which comprises, in combination with an air pipe having an opening therein, a frame surrounding said opening, an annular member mounted in said frame and communicating with said opening and formed with an axial aperture having the shape of a symmetrical spherical segment, and a valve member mounted for swivelling movement in said axial aperture, said valve member being of generally spherical form with the diameter thereof corresponding substantially to that of said central aperture, said valve being provided with a central bore extending completely therethrough and with notches in its outer surface parallel to and equally spaced from said bore, said valve member being rotatable into a position with the axis of its bore coinciding to the axis of said central aperture and into a position with the axis of the bore transverse to the axis of the central aperture and in said latter position with the notches defining a path for flow of air through said central bore and in a position blocking the flow of air through said central bore, said frame having an outer member and an inner radially-spaced inner member supporting said annular member to define an annular aperture surrounding said annular member and providing a peripheral air diffuser, and a movable flange member for closing said annular aperture, said flange member being carried by said annular member for movement therewith, said annular member being externally threaded and said inner member of said frame having internally-threaded portions for engagement with said annular member.

6. An air-distributor according to claim 5, wherein said annular member is slidably engaged with said inner member of said frame member.

7. An air distributor according to claim 5, wherein said annular member is rigidly secured to said inner member of said frame and said flange member is movably mounted on said annular member for axial movement in relation thereto to permit the output of said peripheral diffuser to be adjusted at will.

8. An air distributor according to claim 5, wherein said annular member of said central diffuser is clamped against a duct connecting said annular member to a second air pipe different from the air pipe to which said frame is connected.

9. An air-distributor according to claim 8, wherein one of said pipes is used for delivery and the other of said pipes is used for exhaust purposes.

10. An air-distributor according to claim 8, wherein the two pipes are adapted to be connected to sources of fluids at different temperatures.

References Cited in the file of this patent

UNITED STATES PATENTS

| 2,462,989 | Mufich et al. | Mar. 1, 1949 |
| 2,588,626 | Fourtier | Mar. 11, 1952 |

FOREIGN PATENTS

| 501,926 | Great Britain | Mar. 8, 1939 |